VARIABLE SPEED DOCUMENT TRANSPORT SYSTEM

Filed April 29, 1968 5 Sheets-Sheet 1

INVENTOR.
Harvey G. Patterson
BY
Mueller, Aichele & Rauner
Attys.

VARIABLE SPEED DOCUMENT TRANSPORT SYSTEM

Filed April 29, 1968 5 Sheets-Sheet 2

INVENTOR.
Harvey G. Patterson
BY
Mueller, Aichele & Rauner
Attys.

April 14, 1970 H. G. PATTERSON 3,506,117

VARIABLE SPEED DOCUMENT TRANSPORT SYSTEM

Filed April 29, 1968 5 Sheets-Sheet 3

INVENTOR.
Harvey G. Patterson
BY
Mueller, Aichele & Rauner
Attys.

VARIABLE SPEED DOCUMENT TRANSPORT SYSTEM

Filed April 29, 1968 5 Sheets-Sheet 4

INVENTOR.
Harvey G. Patterson
BY
Mueller, Aichele & Rauner
Attys.

INVENTOR.
Harvey G. Patterson
BY
Mueller, Aichele, & Rauner
Atty's

United States Patent Office 3,506,117
Patented Apr. 14, 1970

3,506,117
VARIABLE SPEED DOCUMENT TRANSPORT SYSTEM

Harvey G. Patterson, Phoenix, Ariz., assignor to Motorola, Inc., Franklin Park, Ill., a corporation of Illinois Filed Apr. 29, 1968, Ser. No. 724,753
Int. Cl. B07c 3/06, 5/00
U.S. Cl. 209—74 16 Claims

ABSTRACT OF THE DISCLOSURE

A pair of drive wheels rotate at a first speed for transporting documents (such as tabulating cards) being processed through a processing station, for example, a card reader. Upon the detection of a predetermined code on the document being processed, further processing is aborted and the card is transported through the station for ejection at an accelerated rate, for example, six times normal transport speed. Simultaneously therewith the next document to be processed is transported toward the processing station. The station includes a code detector for detecting the predetermined code which may be located in predetermined areas on the document being processed. An increase-spaced actuator engages a variable speed drive for increasing the rotational speed of one of the drive wheels. Both drive wheels include one-way clutches for permitting relative speed increases without gearing. Also disclosed is a sorting system for collating cards from a document processor into at least two stacks. First stack is adjacent the exit portion of a processing station and receives cards exiting at the normal processing speed. A second hopper receives those cards exited at accelerated speed. A code on the card is utilized to determine which hopper receives the card.

BACKGROUND OF THE INVENTION

This invention relates to the transportation of documents through document processing machines and particularly to those documents which are desired to be transported at selectively different speeds because of different functions to be performed.

In many document processing machines such as readers and recorders, including punches, magnetic recorders and the like, the processing operation may affect only a small portion of the document being processed. In such operations it may be desirable to speed-up the document when portions of the document not being processed are in the processing station in order to reduce the total time for moving the document through the machine.

Machines have been constructed wherein propragrammed timing cams in the machine cause each document to be transported at the first rate during a first portion of the cycle and then at a predetermined point in the cycle, the transport rate is increased for exciting the document from the machine in a minimum time. However, each time different documents are being processed, the timing cam arrangement must be changed because the point on the document wherein the processing stops varies. Also, only one type of document can be processed in one stack of documents with one type of information with preprogrammed type of arrangement.

SUMMARY OF THE INVENTION

It is an object of the present invention to provide a selective increased speed of document transport through a document processing machine.

A feature of the present invention is the sensing of a predetermined code on the document being processed and means responsive to sensing such predetermined code to abort the processing operation. The document is ejected or excited from the document processing machine at a greatly accelerated rate.

Another feature is the provision of a variable speed drive with a plurality of override or one-way clutches for effecting an increased document transport speed. Another feature of the invention is the synchronization of a document transfer drive means with the accelerated exiting drive such that the next document to be processed arrives in the document processing station soon after the accelerated document has left the machine. It is another feature of the invention to provide an accelerated document exiting system wherein either detection of a trailing edge of a document or the detection of a predetermined code on the document is operative to initiate acceleration of the document.

A document processing machine has entering and exiting drive wheels for frictionally transporting documents through a document processing station. Upon detection of a predetermined code or indicia recorded on a document being transported through the station, the exiting drive wheel is speeded-up, moving that document at an increased rate, for example, 6 times the initial transport rate. Override or one-way clutches are provided in the drive system to permit variable speeds. The entering drive wheel has an override clutch permitting it to rotate faster whenever a document in the station is speeded up.

Simultaneously with acceleration of the document in the processing station another document is fed from a hopper toward the processing station but at a slower initial rate of transport. The arrangement is such that the document being exited may still be under the exiting drive wheel when the new document reaches the entering drive wheel. At this time the entering drive wheel is rotating at its normal speed.

A document in a processing station may be speeded up and no new document fed from a hopper of cards except upon detection of a trailing edge of the document being processed. One usage of such an arrangement is to read data marks in closely spaced columns of data at a low rate of document transport and read other data marks in columns spaced further apart at a higher rate of document transport. In such an instance the data rate from the sensing station can be maintained at a predetermined rate, irrespective of the data recording density on the document being processed.

A sensor is provided in the processing station to detect the trailing edge of the document being exited. Detection of a trailing edge is utilized to accelerate the document being exited and to bring another document into the processing station.

Sorting between two classes of documents is provided. A code on one class of documents is utilized to actuate the increased speed exiting to cause all documents in that class to be ejected into a remote hopper while all documents in the second class are exited at the slower initial transport rate for being deposited in a hopper close to the exit throat of the processing station.

THE DRAWING

DETAILED DESCRIPTION OF THE ILLUSTRATIVE EMBODIMENT

Figure 1:
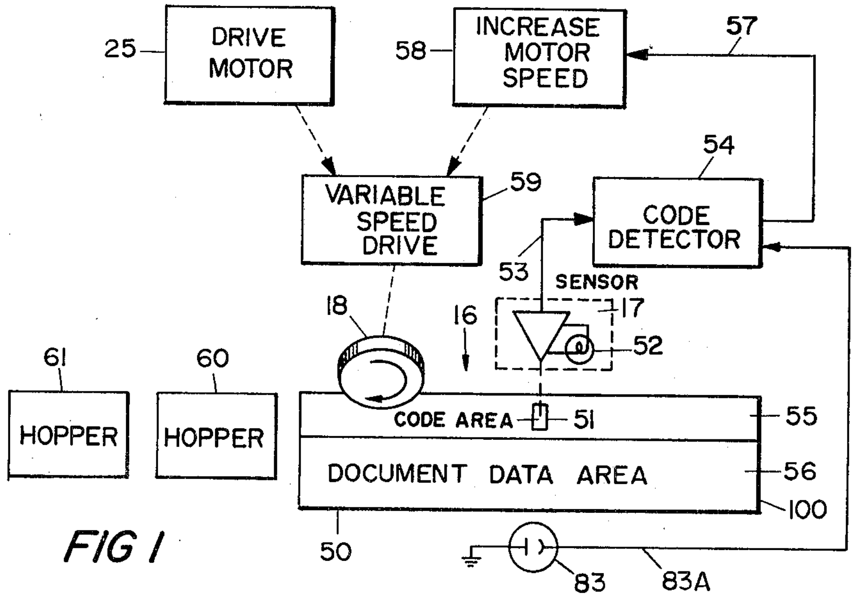
FIG. 1 is a block diagram of a system incorporating the teachings of the present invention.

With more particular reference now to the drawings, like numbers indicate like parts and structural features in the various views and diagrams. Attention is drawn to the FIG. 8 diagram for an understanding of the relative motions of the drive system. A document processing machine in the form of a tabulating card reader is shown in FIGS. 2–10 without its normal housing to clearly illustrate the invention. FIG. 1 illustrates the systems aspects of the invention.

First, with particular reference to FIG. 1, a document 50 (a tabulating card) being transported through the document processing machine illustrated in FIGS. 2 through 10, is moved by exiting drive wheel 18. Document 50 has an encoding area 51 containing a code indicating that the document is to be transported through the station at an increased speed once the code has been detected. Code sensor 52 in sensing head assembly 17 supplies a signal over line 53 to code detector 54 which detects the predetermined code and ignores other codes which may be contained in area 55 of document 50. The data recording area on the document is shown as area 56. Indicia in this latter area is processed in the usual manner and will not be discussed for that reason. Code detector 54 upon detection of the speed-up code supplies an actuating signal over line 56 to increase-speed actuator 58. Drive motor 25 drives variable-speed drive mechanism 59 at a constant speed until increase-speed actuator 58 engages a clutch, later described, in variable-speed drive 59 to increase the rotational velocity of exiting drive wheel 18, whereupon document 50 is more rapidly transported through the machine.

Also shown in FIG. 1 are two receiving hoppers 60 and 61. These hoppers are spaced from the processing station 16 (FIG. 2) a distance in accordance with the exit speed of document 50. For example, receiving hopper 60 receives all documents exiting at the transport rate used when a document is being processed. Accordingly, when documents 50 are desired to be deposited in receiving hopper 60, no code 51 is recorded on the document and therefore, the document will be transported through the machine at the processing rate. On the other hand, if a document is to be deposited in receiving hopper 61, a coded area 51 is placed somewhere on the document 50 such that it can be exited at a much greater rate for bypassing hopper 60, i.e., overshooting hopper 60, such that it enters hopper 61. A deflecting panel (not shown) may be placed on hopper 61, such that it does not overshoot that hopper also.

Referring now to FIGS. 2–10, the reader includes frame 10 on which all of the various components of the machine are suitably mounted. The platen upper surface 11 movably receives documents from hopper 12. Selectively rotatable document transport rotor 13 moves documents one at a time from hopper 12 to just under entering drive wheel 14. Drive wheel 14 engages a document against idler wheel 15 and moves it forwardly through the processing station generally designated by numeral 16 and including a set of photoelectric read heads (photoelectric diodes or transistors) diagrammatically illustrated by numeral 17. As the document proceeds through station 16 the exiting drive wheel 18 engages the document against idler wheel 19 and continues the transportation of the document to outside station 16. In utilizing this invention the exiting drive wheel 18 is selectively rotated at an increased speed to selectively exit the document at a greatly increased rate. Entering drive wheel 14 is not so increased in speed since the next document entering the station 16 should not enter at an increased rate. Therefore, it is important that only the exiting drive wheel 18 have an increased rate while the drive wheel 14 remains at a processing transport rate. One-way clutch 21 (FIG. 2) permits the drive belt 22 to rotate entering drive wheel 14 and yet permits wheel 14 to freely rotate at higher speeds in the event the document being accelerated is still engaging drive wheel 14.

Because there are a plurality of override or one-way clutches used in the illustrative embodiment, such clutches are generally described before proceeding with the details of the variable speed drive system. Such clutches are well known to prevent back-rotations and provide differential speeds in rotating-type drive systems. An override clutch permits a first driving system to rotate a driven wheel at a first rotational rate yet permits the driven wheel to rotate faster (by second driving means) without a drag from the slower first driving means. This can be termed free wheeling in a first rotational sense—relative rotation in the reverse sense (back rotation) is stopped, viz, the term one-way clutch. Examples of such override clutches are the so-called ball-and-ramp type and spring-type. Either type is suitable for use in the present invention. Both types are presently commercially available. One category of the spring-type override clutches has a hub input with a shaft output. A cylindrical housing has a spring which when wound tight frictionally connects the input hub to the output shaft. When the cylinder is permitted to rotate with the input hub, the spring is wound tight, while if held stationary the spring is loosened disconnecting the hub from the shaft. Even if the cylinder is permitted to rotate with the input hub, the output shaft rotating faster unwinds the spring to disconnect the shaft from the input hub. Clutches having the above-described functional characteristics may be purchased commercially from Precision Specialities Inc., Box 118, Pitman, N.J. A small ball-and-ramp type clutch is available from Torrington Bearing Corp., Torrington, Conn.

First, the operation of the machine at the normal transport rate is described. The various directions of rotation are indicated by the arrows in the various views and diagrams. The arrows on the one-way or override clutch symbols indicate driving direction; relative rotation between the output shaft and the input hub in the reverse direction permits the shaft to freely rotate with respect to the input hub. See the legend in FIG. 8. A constant speed drive motor 25 has a gear box 26 (FIG. 3) for rotating main drive pulley 27 at a constant rotational velocity. Drive belt 28 of any suitable design engages driven pulley 29 for rotating it at an increased rate because of the difference of diameters between pulleys 27 and 29. Driven pulley 29 is fixedly secured to one end of main drive shaft 30 which is rotatably secured through center wall 77 of frame 10.

Drive pulley 70 (FIGS. 4 and 8) secured to main drive shaft 30 engages drive belt 22 which rotates one-way clutches 21 and 73 in the direction of the arrows. Shafts 80 and 81 respectively couple the driven parts of clutches 21 and 73 to drive wheels 18 and 14. Drive belt 22 is properly tensioned by idler pulley 72 rotatably mounted on adjustable mount 71. Drive belt 22 rotates drive wheels 14 and 18 at a constant speed moving any documents through processing station 16 at a constant speed suitable for sensing indicia thereon.

Figure 8:
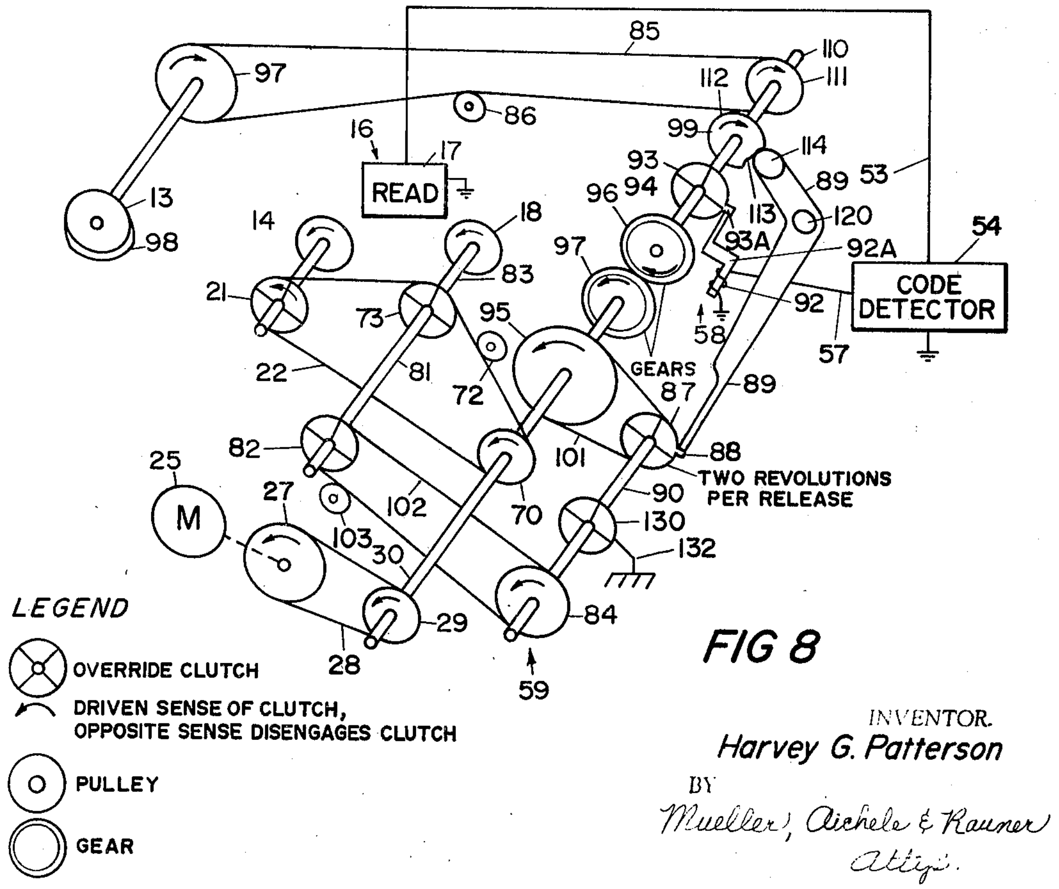
FIG. 8 is a schematic diagram of the illustrated machine with spatial relationships of the various moving parts modified to more clearly show relative motions and viewed in the same direction as the FIG. 2 elevation.

The speeded-up document transport is provided by increasing the rotational velocity of exiting drive wheel 18. Entering drive wheel 14 is not accelerated except as incidentally caused by an accelerated document thereunder. Override clutch 21 permits drive wheel 14 to rotate faster than drive belt 22 rotates, i.e., the sole purpose of override clutch 21 is to permit drive wheel 14 to free wheel with a speeded-up document. Drive wheel 14 cannot be used as a speed-up drive wheel because the next successive document entering read station 16 is engaged by wheel 14 prior to the time that the exiting document has left the station. It is desired to have the entering document enter at the processing or constant speed. By delaying entry of the next successive document into station 16, both drive wheels 14 and 18 could be accelerated. Override clutch 73 having shaft 81 as its output shaft, permits drive wheel 18 (thus shaft 81) to increase its speed with respect to the rotational velocity of the input hub of clutch 73 driven by constant speed belt 22. Referring to FIG. 8, shaft 81 is permitted to free-wheel in direction of the arrow on clutch 73. This increased speed of the output shaft is equivalent to the input hub rotating in a sense opposite to the direction of the arrow.

The increased rotational velocity of drive wheel 18 is provided by one-way clutch 82 on shaft 81. During the constant speed portion of a document transport the input hub of override clutch 82 is stationary with the one-way action permitting shaft 81 to freely rotate. However, when it is desired to increase the rotational velocity of drive wheel 18, the variable speed drive mechanism 59 (FIGS. 2 and 8) is engaged such that the greater diameter drive pulley 84 rotates the input hub of clutch 82 at an increased rotational velocity. Shaft 81 is then frictionally connected to the clutch 82 input hub causing increase drive speed of drive wheel 18. For example, an increase in speed of 6-to-1 was used in one constructed embodiment.

In the illustrated embodiment, the drive rotor 13 used to transport a document out of a hopper 12 toward read station 16 is actuated simultaneously with an increase in rotational velocity of exiting drive wheel 18, no limitation thereto intended. As explained with respect to FIG. 1, code detector 54 is responsive to a predetermined code in area 51 to supply an actuating signal over line 57. The trailing edge 100 of document 50 is also sensed by photocell 83 as an increase in light intensity from light source **17*a* and supplies a signal over line 83A to actuate code detector 54 to supply the actuating signal over line 57. As an alternative, the trailing edge detection may be accomplished by providing a low reflectivity area in read station 16, wherein all of the sensors 52**, such as 10 or 12 individual sensing units, simultaneously provide a decrease in light output. A decrease in output signal of *all* sensors indicates no document is in the read station 16. This output is differentiated to provide a signal to code detector 54 indicating the document is leaving the station and the exiting document should be accelerated. Therefore, the document being processed through the station 16 can be accelerated in speed either upon the detection of the trailing edge 100, upon the predetermined code in area 51, or both.

When a document is to be moved into station 16 when the document presently in station 16 is accelerated, the position of code area 51 is limited by the spacing between exiting drive wheel 18 and read assembly 17. In this situation, exiting drive wheel 18 must be frictionally engaging the document 50 is station 16 so it will be immediately accelerated such that the document entering station 16 will not reach station 16 while document 50 is still under sensors 52. When photocell 83 supplies a signal actuating rotor 13 drive assembly, later described, independently of the variable speed drive 59, such limitation on location of code area 51 is not required. In this latter instance, exiting drive wheel 18 must be maintained at the incerased speed until photocell 83 detects trailing edge 100. In this illustrated embodiment, exiting drive wheel 18 is rotated faster than usual for a short predetermined time because of the limitation on location of code area 51 on document 10, no limitation of the invention to such an arrangement is intended.

The increased speed actuator 58 consists of a solenoid 92 (FIG. 7, 8, 10) having an armature 92A spring urged into engagement with radially outwardly extending dog or stop 92A on a central cylinder of override clutch 93. When armature 92A is urged into engagement with dog 93A, the clutch 93 central cylinder is held stationary to disengage the clutch. Upon receipt of a positive signal on line 57, solenoid 92 pulls armature 92A downwardly permitting clutch 93 to be engaged to initiate accelerated document transport and supplying another document from hopper 12 to station 16. The line 57 signal is momentary, permitting armature 92A to return to engage and stop clutch 93 at the end of one revolution. One revolution of clutch 93 corresponds to movement of rotor 13 sufficient to move one document from hopper 12 to engage entering drive wheel 14 for further transport through station 16.

The driving mechanism coupling continuously rotating main drive shaft 30 to rotor 13 includes drive shaft 94, continuously rotating in the direction of the arrow on gear 96 which in turn is driven by gear 97 securely mounted on main drive shaft 30. The purpose of gears 96 and 97 is to reverse the direction of rotation for operating the pulley 97 on rotor 13 to rotate in the proper direction. When engaged, clutch 93 rotates shaft 110 in the direction of the arrow on drive pulley 111. Drive belt 85 on pulley 111 rotates pulley 97 on rotor 13. To ensure the same rotational position of rotor 13 when armature 92A is engaging dog 93A (no document is being fed from hopper 12) belt 85 is provided with serrations which engage teeth (not shown) on pulleys 84 and 97. Idler wheel 86 tensions belt 85. For each document being fed from hopper 12, shaft 110 rotates one revolution, causing the rotor 97 to rotate one revolution. Rotor 97 has frictional engaging material 98 on one diameter such that one revolution will cause a document to be moved from hopper 12 in processing station 16. Rotor 13 can be designed to move one document for each one-half revolution; in such an instance, the pulley 97 and 84 diameters are adjusted accordingly.

Once transport of a new document is initiated the exiting drive wheel 18 is then speeded up.

Figure 6:
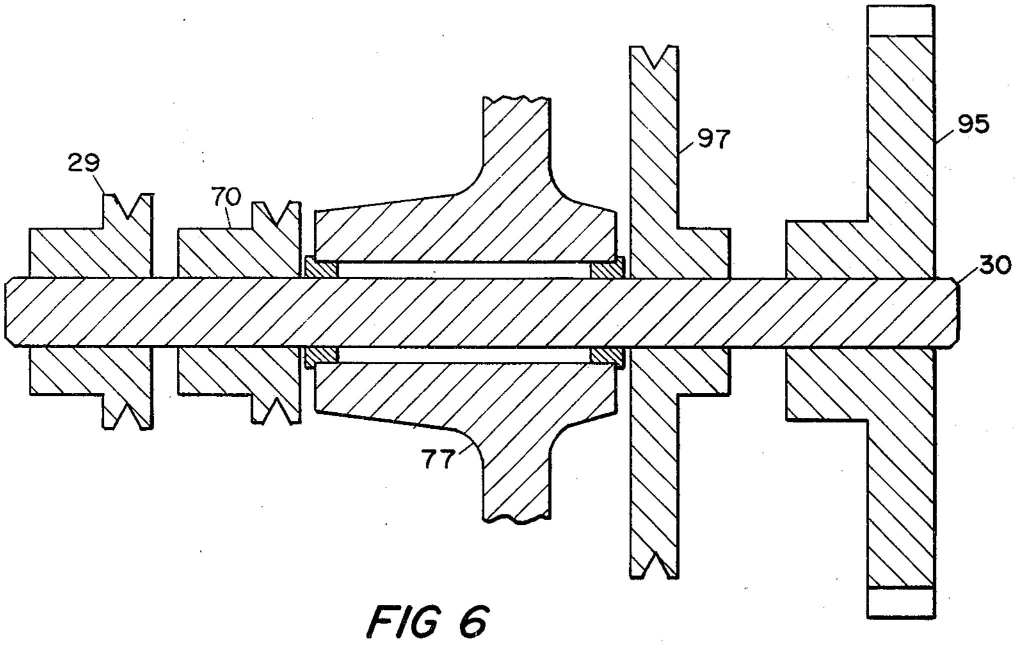
FIG. 6 is a diagrammatic enlarged sectional view taken in the direction of the arrows along line 6—6 in FIG. 3.
Figure 7:
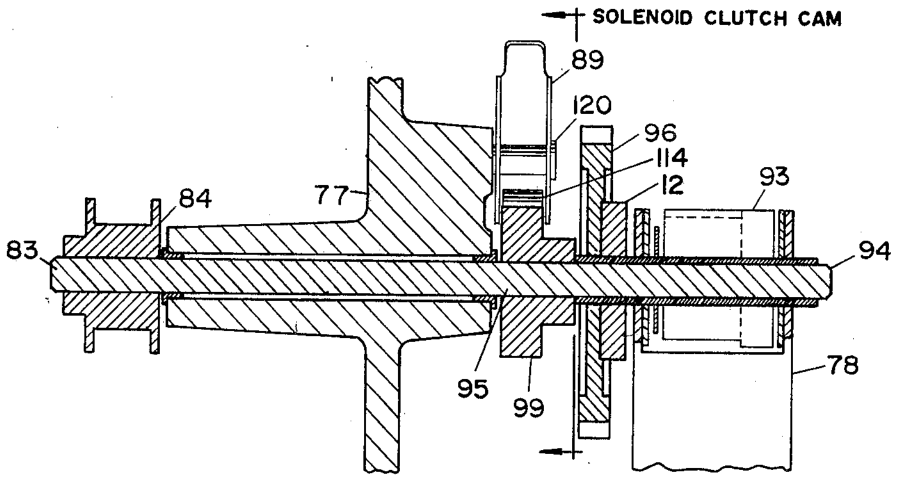
FIG. 7 is a diagrammatic enlarged sectional view taken in the direction of the arrows along line 7—7 of FIG. 3.

The acceleration of exiting drive wheel 18 is accomplished when cam 99 on combined shaft 110 cams stop member or arm 89 from engagement with radially outwardly extending dog 88 for two revolutions of clutch 97. Spring 91 urges stop arm 89 into engagement with dog 88. The input hub or drive portion of clutch 87 is continuously rotated by belt 101 driven by pulley 95 secured to shaft 30 next to gear 97 (FIG. 6). Shaft 90 transmits the rotational power to drive wheel 84 which is connected by belt 102 to one-way clutch 82 input hub. Idler wheel 103 properly tensions belt 102.

Figure 2:
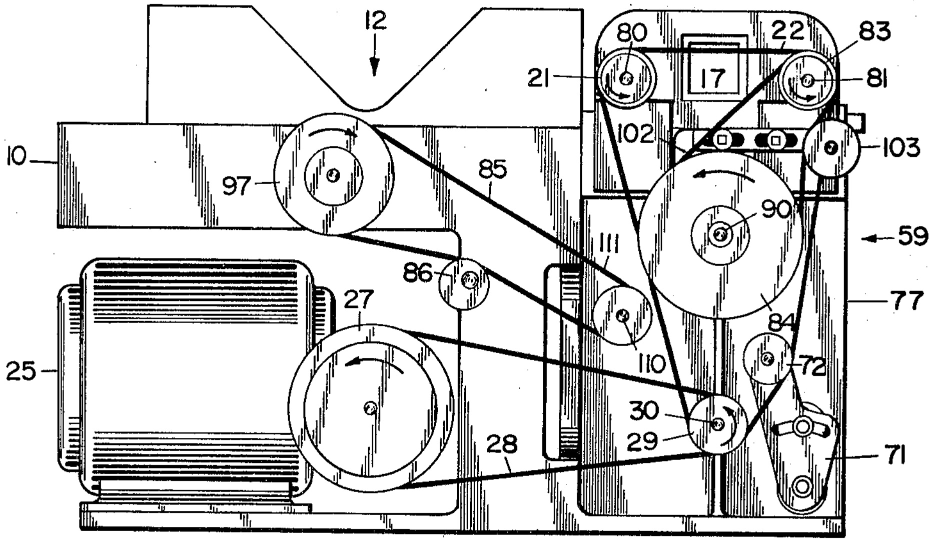
FIG. 2 is a first diagrammatic side elevation of a machine used to illustrate one constructed embodiment of the present invention.
Figure 3:
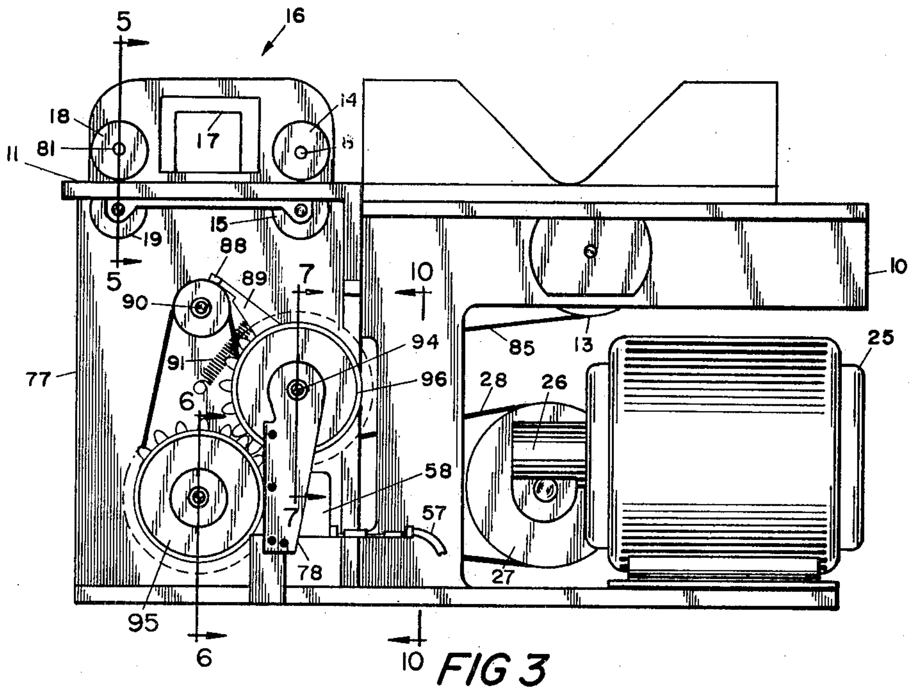
FIG. 3 is a second diagrammatic side elevation view of the FIG. 2 machine taken from the opposite side from the elevation of FIG. 2.

The six-to-one speed increase of exiting wheel 18 with respect to the normal transport rate is now explained. Referring to FIG. 2, it is seen that drive pulley 84 is three times the diameter of driven one-way clutch 82 to give a three-to-one speed increase. A two-to-one speed increase is provided between drive pulley 97, it having a diameter twice the diameter of driven pulley or input hub portion of one-way clutch 87. Therefore, shaft 90 and pulley 84 rotate at twice the angular velocity of the main drive shaft 30. It is obvious that this combination of twice and three times the speed increase yields a sixfold speed increase. It should also be noted that the one-way clutch 87 rotates twice for each revolution of main drive shaft 30. To permit dog 88 on one-way clutch 87 to complete two revolutions without being stopped by stop member 89, cam 99 has a a long radially enlarged area 112 during which time stop arm 89 is out of engagement with radially extending dog 88. The radially reduced portion 113 of cam 99 is just sufficient to receive cam follower 114 to place stop arm 89 in a rest position for engaging dog 88. Since cam 99 rotates once for each revolution of main drive shaft 30 and the radially enlarged portion 112 is substantially 80% of the circumference of the cam; the dog 88 on one-way clutch 87 will have completed more than one revolution before stop arm 89 returns to its rest or dog engaging position, thereby permitting the shaft 90 to complete two revolutions. It is apparent then, that exiting drive wheel 18 will complete six revolutions of accelerated speed which has been found sufficient to exit documents within read station 16 when the acceleration is initiated either by detecting a code area 51 or upon the detection of a trailing edge 100.

Figures 9, 10:
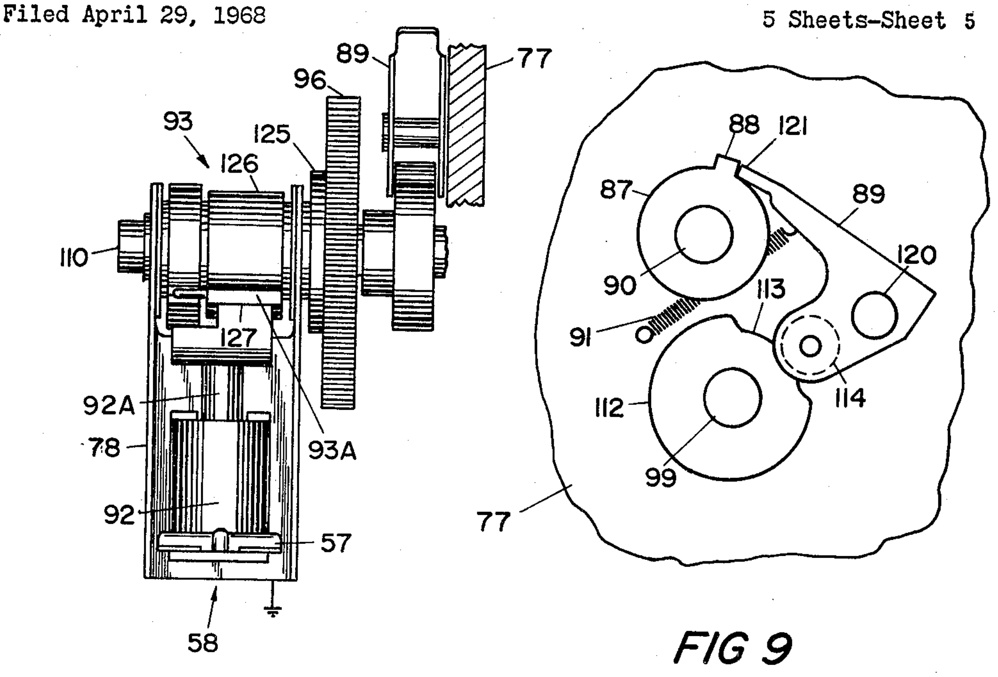
FIG. 9 is a partial diagrammatic sectional view showing a cam actuated increased speed actuator and taken in the direction of the arrows along line 9—9 in FIG. 4.
FIG. 10 is a partial sectional view showing a solenoid actuated release for actuating the hopper document transport system of the illustrated embodiment and taken in the direction of the arrows along line 10—10 in FIG. 3.

Referring next to FIG. 9, the detailed construction of stop arm 89 is shown as now described. Stop arm 89 is pivotally secured to center wall 77 by bolt 120. Arm 89 has generally a right angle or L-shaped configuration with the cam follower 114 at the lower end engaging radially reduced portion 113. The upper extreme end 121, engages dog 88, as cam 99 is rotated by shaft 110, cam follower 114 rides up on the radially outward portion 112 rotating arm 89 clockwise around pivot bolt 120 moving upper or extreme end 121 out of engagement with dog 88. The action permits one-way clutch 87 to drive shaft 90 as aforedescribed. As cam 99 continues to rotate, the radially outward portion 112 keeps cam follower 114 in a clockwise position until more than one revolution of override clutch 87. At this time cam follower 114 again enters the radially reduced portion 113 permitting the extreme end 121 to reengage dog 88 stopping the speeding up of exiting drive wheel 18 at the end of the second revolution of shaft 90.

Referring next to FIG. 10, the details of increase-speed actuator 58 are shown. This apparatus also initiates transport of a document from hopper 12. Override clutch 93 has shaft 110 as its output shaft which is journaled through input hub 125 and continuously rotating gear 96. Gear 96 and input hub 125 are bolted together, for example. Shaft 110 is also journaled in the upstanding mount 78. The central cylinder 126 of one-way clutch 93 has a radially outwardly extending dog 93A normally engaged by armature 92A of solenoid 92. Armature 92A is spring urged into engagement with dog 93A and pivoted directly beneath one-way clutch 93 such that when solenoid 92 is actuated, armature 92A is moved downwardly such that it pivots around the pivot point (not shown) freeing its dog engaging end 127 from radially extending dog 93A. The central cylinder 126 being free rotates with input hub 125 winding the spring tightly and thereby frictionally engaging output shaft 110 to input hub 125 for rotating the shaft 110 one revolution. The input signal over line 57 is momentary, that is, aproximately 100 milliseconds such that the one-way clutch 93 has sufficient time to wind its spring (not shown) and rotate dog 93A to below dog engaging end 127. Upon release of the solenoid 92 the armature 92A is spring urged back into dog engaging position. As the dog 93A continues to rotate around shaft 110, at the end of one revolution it reengages end 127 and thereby disengages shaft 110 from input hub 125. It should be noted that the other one-way clutches having radially extending dogs as previously described are constructed in the same manner as the one-way clutch 93. The FIG. 10 apparatus including elements supported by member 78 but excluding gear 96 and shaft 110 are commercially available from Precision Specialities Inc., supra.

While in the illustrated embodiment, the speed-up of exiting drive wheel 18 is initiated as part of the drive mechanism used to actuate rotor 13 for transporting the next succeeding document from hopper 12 into station 16, no limitation thereto is intended. It is to be understood that the invention contemplates separate actuation of exiting drive wheel 18 independent of the transport of any document from hopper 12. It is believed, however, that the illustrated embodiment and the concept of simultaneously actuating a document transport into station 16 and the acceleration of the exiting document on a simultaneous basis is a preferred form of utilizing the invention. This cooperative relation reduces the total time required to process a stack of documents through a document processing machine.

In the event of separately actuating rotor 13 and the variable speed device 59 for exiting wheel 18, a third gear (not shown) engages gear 97 with a duplicate of shaft 110 and clutch 93 being used to rotate pulley 111. The illustrated mechanism would be used only for speeding up exiting device wheel 18.

Figure 4:
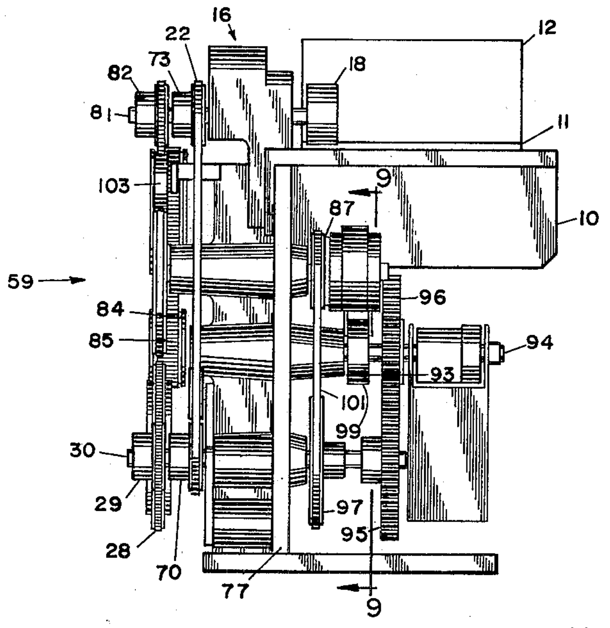
FIG. 4 is an end elevational view of the FIG. 2 machine showing the various spatial relationships between the drive belt and one-way clutches and looking toward the exist portion of the document processing machine.
Figure 5:
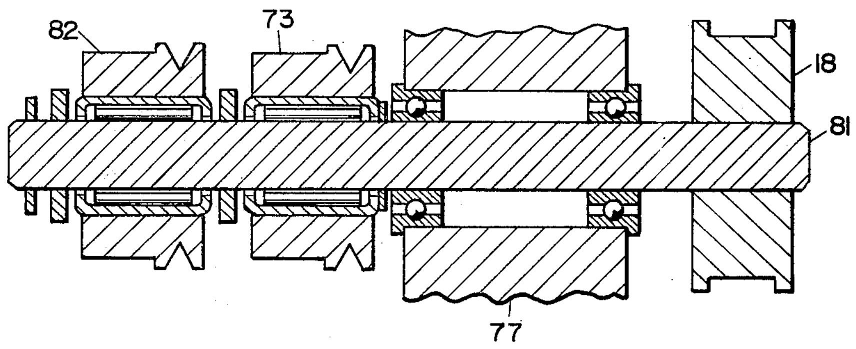
FIG. 5 is a diagrammatic enlarged sectional view taken in the direction of the arrows along line 5—5 of FIG. 3.

As shown in FIG. 4, one-way clutch 130 is press fit into boss 131 through which shaft 90 extends. Such a one-way clutch is available from the Torrington Bearing Corp., supra, and serves to prevent back rotation from the increase-speed drive mechanism including pulley 84, one-way clutch 82 and shaft 81 from affecting the operation of one-way clutch 87 and pulley 95. It has been found that the insertion of the one-way clutch in boss 131 prevents such back rotation such that improved antifriction properties are found in the intermittent drive system. It is to be noted that the one-way clutch 130 is interposed between one-way clutch 87 and pulley 84. The housing or central cylinder of clutch 130 is press fit into boss 131 as indicated by the line 132 in FIG. 8.

What is claimed is:

1. Apparatus for transporting documents through a processing machine station at selectively different transport rates, including, in combination, entering and exiting drive wheels for engaging a document to be transported through a processing machine station, a one-way clutch secured to each drive wheel for rotating the respective drive wheel in the first direction at a first rate, first drive means actuating said one-way clutches for rotation at a given velocity, a third one-way clutch operatively connected to said exiting drive wheel, second drive means operatively connected to said third one-way clutch and selectively operative to drive said third one-way clutch at an increased rate for rotating said exiting drive wheel at said increased rate and said one-way clutch secured to said exiting drive wheel permitting said drive wheel to rotate at a greater rate without affecting said first drive means and said one-way clutch secured to said entering drive wheel permitting said entering drive wheel to rotate at said increased rate irrespective of said first drive means.

2. The apparatus of claim 1 further including hopper means for containing a plurality of documents to be transported through said processing machine station and having document transport means and, clutch means connected to said document transport means and said second drive means for actuating said document transport means and simultaneously actuating said second drive means to rotate said exiting drive wheel at said increased rate such that any document in the processing machine station is exited at a high rate while the entering document is entered at said given rate.

3. The apparatus of claim 2 further including a motor, a main drive shaft connected to said motor for rotation, a gear on said main drive shaft for rotation therewith, a second gear engaging said first gear, a second drive shaft secured to said second gear for rotation therewith in a sense opposite to said main drive shaft rotational sense, said clutch means being on said second drive shaft and having an input hub portion rotating with said second drive shaft, said clutch means having engaging means for selectively connecting said second gear to said document transport means, and electrical means including first stop arm means engaging said engaging means in said clutch means and when actuated disengaging said stop arm means from said engaging means for permitting said clutch means to engage for at least one revolution.

4. The apparatus of claim 3 wherein said second drive means includes means on said second shaft and on said main draft shaft operatively connected to said third one-way clutch to selectively rotate same for a predetermined number of revolutions each time said clutch rotates one revolutions.

5. The apparatus of claim 4 wherein said means on said second shaft is a cam having a radially enlarged area to correspond to a predetermined number of revolutions of said exiting drive wheel and having a radially reduced circumferential area corresponding to said position of said clutch means rotational position when disengaged, a third shaft in said second drive means having a pulley with enlarged radius, a one-way clutch having the shaft as its output portion and a hub input portion with a central cylinder means which when rotating couples the input hub to said output portion, second stop arm means having a cam follower engaging said cam for moving said stop arm means between first and second positions as said cam rotates, said second position corresponding to said cam follower engaging said radially enlarged portion of said cam, said second stop arm when in said first position engaging said dog on said central cylinder for preventing its rotation to disengage said input hub from the said third shaft and when in its second position being disengaged from said dog for connecting said input hub to said third shaft.

6. A subject matter of claim 5 further including one-way clutch means on said third shaft including a central cylinder fixedly secured to a frame of said apparatus.

7. Apparatus for processing documents including in combination, a transport table over which documents may move, one drive wheel disposed adjacent said transport table for engaging and moving documents thereacross, sensing means adjacent said drive wheel for sensing a predetermined code on a document being transported therethrough and supplying a signal indicative thereof, variable speed drive means connected to said one drive wheel for rotating same at a given rate and responsive to said signal to speed up said one drive wheel for transporting documents therethrough at an increased rate and operative to reduce said drive wheel rotation to said given rate after completion of said increased rate transport indicated by said predetermined code.

8. The apparatus of claim 7 further including document source means including document transport means and responsive to said sensing means sensing a predetermined code for causing a new document to move over said transport table toward such sensing means.

9. The apparatus of claim 8 further including a second drive wheel which is an entering drive wheel to the processing station and operatively connected to said variable speed drive means for rotation at a constant rate and including one-way clutch means for permitting said entering drive wheel or free wheel with any document being transported thereunder at said increased rate.

10. The apparatus of claim 9 wherein said variable speed drive means includes constant speed drive portion and an increased speed drive portion, a single motor operatively connected to both said drive portions for causing said constant speed drive portion to be continuously operative for continuously rotating said drive wheels at a constant rotational velocity, one-way clutch means respective coupling said constant speed drive portion to said drive wheels for permitting wheels to rotate at an increased rate, said variable speed drive portion responsive to said sensing of a predetermined code to momentarily engage said one drive wheel for rotating it at an increased rate for a predetermined number of revolutions and at the end of said predetermined number of revolutions operative to disengage therefrom such that both drive wheels are again operated at said given rate.

11. The apparatus of claim 10 wherein said variable drive means includes one-way clutch means having an input hub continuously actuated by said constant feed drive means and including deactuating means for disengaging said variable speed drive means from said constant speed drive means, said constant speed drive means including a main drive shaft rotating at a constant velocity, a gear on said main drive shaft for rotation therewith, a second drive shaft having a gear thereon for rotation therewith and gearingly engaged with said first mentioned gear such that said second gear rotates at a constant rotational velocity of said main drive shaft and in an opposite rotational sense, an increase speed one-way clutch having an input hub and an output shaft, said input hub rotating with said second drive shaft, and a cam on said output shaft having a radially enlarged portion for the greater extent of its circumference and a radially reduced portion corresponding to the apparatus transporting a document at said given rate with the radially enlarged portion corresponding to the apparatus transporting the document at an increased rate, cam follower means engaging said cam and when in said radially reduced portion engaging said disengaging means for disengaging said main drive shaft from said variable speed drive means and when said cam follower is on said radially enlarged portion being disengaged from said deactuating means whereby said variable speed drive is operatively connected to said main drive shaft and speed-up means in said variable speed drive means for causing said exiting drive wheel to rotate at a greater rotational velocity whenever said cam follower is on said radially enlarged portion and said exiting drive wheel rotating at said increased rate only a predetermined number of revolutions.

12. The apparatus of claim 11 further including document transport means for selectively moving a document over said transport table to engage said entering drive wheel for transport through said station and connected to said output shaft for movement therewith as said output shaft rotates to move a document.

13. The apparatus of claim 12 further including trailing edge detection means in said station and upon detection of a document trailing edge supplying a signal to said variable speed drive means, and said variable speed drive means being responsive to the last mentioned signal in the same manner it responds to the first-mentioned signal.

14. The method of transporting a document through a document processing machine, the document having code recording areas thereon for recording a predetermined code, the method including in combination, sensing the data recorded on said document in said data recording area and upon the detection of the predetermined code to increase the transport rate of said document and upon not detecting such a code to transport said document at another rate through said machine.

15. The method of claim 14 wherein said document further includes data recording areas in addition to said code recording area and simultaneously sensing both areas as a document is transported through the machine and upon the detection of a predetermined code to stop all document processing and exit the document at a greatly increased rate.

16. The method of claim 15 for processing a succession of documents through a processing machine, several documents having a predetermined code recorded thereon, other documents having no predetermined code thereon and exiting the documents having a predetermined code at a highly increased rate such that documents overshoot a first hopper and land in a second hopper and all the documents not having a predetermined code being exited at a slow rate for being inserted in said hopper being overshot by the documents having said predetermined code recorded thereon.

References Cited

UNITED STATES PATENTS 2,337,064 12/1943 Peters ---------------- 209—88

ALLEN N. KNOWLES, Primary Examiner

U.S. Cl. X.R.

209—120